United States Patent
Pauer et al.

(10) Patent No.: US 11,280,353 B2
(45) Date of Patent: Mar. 22, 2022

(54) SUCTION JET PUMP WITH SEALING OF THE INJECTION MOLD INSTALLATION OPENING BY A METAL BALL FIXED WITH PLASTIC DEFORMATION

(71) Applicant: Continental Automotive GmbH, Hannover (DE)

(72) Inventors: Bernd Pauer, Eppstein (DE); Bastian Lücke, Dortmund (DE)

(73) Assignee: Vitesco Technologies GmbH, Hannover (DE)

( * ) Notice: Subject to any disclaimer, the term of this patent is extended or adjusted under 35 U.S.C. 154(b) by 54 days.

(21) Appl. No.: 16/315,927

(22) PCT Filed: Jul. 10, 2017

(86) PCT No.: PCT/EP2017/067239
§ 371 (c)(1),
(2) Date: Jan. 7, 2019

(87) PCT Pub. No.: WO2018/011130
PCT Pub. Date: Jan. 18, 2018

(65) Prior Publication Data
US 2019/0331140 A1    Oct. 31, 2019

(30) Foreign Application Priority Data

Jul. 14, 2016    (DE) .................... 10 2016 212 858.2

(51) Int. Cl.
*F04F 5/44* (2006.01)
*B29C 69/00* (2006.01)
(Continued)

(52) U.S. Cl.
CPC ............... *F04F 5/44* (2013.01); *B23P 19/02* (2013.01); *B29C 69/00* (2013.01); *B60K 15/03* (2013.01);
(Continued)

(58) Field of Classification Search
None
See application file for complete search history.

(56) References Cited

U.S. PATENT DOCUMENTS 4,717,903 A * 1/1988 Hinterberger .......... H01C 10/30
338/162
5,759,668 A    6/1998 Ishikawa et al.
(Continued)

FOREIGN PATENT DOCUMENTS

CN    103033075    4/2013
DE    195 30 367 A1    4/2003
(Continued)

OTHER PUBLICATIONS

Saechtling, Hansjürgen: Kunststofftaschenbuch, 25, Auflage, München: Carl Hanser Verlag, 1992. pp. 118-121.—ISBN 3-446-16498-7.
(Continued)

*Primary Examiner* — Peter J Bertheaud
*Assistant Examiner* — Geoffrey S Lee
(74) *Attorney, Agent, or Firm* — Cozen O'Connor

(57) ABSTRACT

A method for the production of a suction jet pump delivering fuel into or out of a fuel tank, wherein the suction jet pump has a flow channel and a nozzle, and wherein the flow channel forms a feed line to the nozzle and the flow channel is formed in one piece with the nozzle, the method including, in the following order: placing a mold core into a matrix to produce the suction jet pump by injection molding and form a cavity between the mold core and the matrix; encapsulating the mold core and filling the cavity formed between mold core and matrix with a plastic; removing the mold core through an installation opening, arranged opposite the nozzle, in the flow channel; and closing the installation
(Continued)

opening by thermal deformation, in the edge region of the installation opening, of the plastic used for the production of the suction jet pump.

15 Claims, 2 Drawing Sheets

(51) Int. Cl.
*B29L 31/00* (2006.01)
*B23P 19/02* (2006.01)
*B60K 15/03* (2006.01)
*F02M 37/02* (2006.01)

(52) U.S. Cl.
CPC ...... *F02M 37/02* (2013.01); *B29L 2031/7496* (2013.01)

(56) References Cited

U.S. PATENT DOCUMENTS

| | | | |
|---|---|---|---|
| 6,488,476 B2 | 12/2002 | Eck | |
| 8,459,960 B2* | 6/2013 | Mason | F04F 5/463 417/79 |
| 9,546,670 B2* | 1/2017 | Malec | F04F 5/46 |
| 9,726,200 B2* | 8/2017 | Zmuda | F04F 5/466 |
| 10,294,901 B1* | 5/2019 | Mason | F02M 37/0017 |
| 10,309,424 B1* | 6/2019 | Mason | F02M 37/007 |
| 2002/0172601 A1* | 11/2002 | Lienig | F04F 5/46 417/198 |
| 2003/0226548 A1* | 12/2003 | Herzog | F02M 37/0029 123/514 |
| 2009/0290994 A1 | 11/2009 | Kieninger et al. | |
| 2011/0122617 A1* | 5/2011 | Frey | F21S 41/39 362/235 |
| 2014/0079567 A1* | 3/2014 | Malec | F04F 5/46 417/198 |
| 2015/0210159 A1* | 7/2015 | Maguin | F01N 3/2066 60/295 |
| 2019/0331140 A1 | 10/2019 | Pauer et al. | |

FOREIGN PATENT DOCUMENTS

| | | |
|---|---|---|
| DE | 10 2006 016 515 A1 | 10/2007 |
| DE | 10 2012 210995 A1 | 1/2014 |
| DE | 10 2012 211847 A1 | 1/2014 |
| DE | 102014207221 | 10/2015 |
| EP | 10 301 367 A1 | 4/2003 |
| EP | 3485159 | 5/2019 |
| JP | 2004 055829 A | 2/2004 |

OTHER PUBLICATIONS

Office Action dated Mar. 3, 2021 issued in Chinese Patent Application No. 201780035188.5.

\* cited by examiner

SUCTION JET PUMP WITH SEALING OF THE INJECTION MOLD INSTALLATION OPENING BY A METAL BALL FIXED WITH PLASTIC DEFORMATION

CROSS-REFERENCE TO RELATED APPLICATIONS

This is a U.S. national stage of application No. PCT/EP2017/067239 filed on 10 Jul. 2017, which claims priority to the Germany Application No. 10 2016 212 858.2 filed 14 Jul. 2016, and the content of all incorporated herein by reference.

BACKGROUND OF THE INVENTION

1. Field of the Invention

The invention relates to a method for the production of a suction jet pump for delivering fuel in a fuel tank or out of a fuel tank and a suction jet pump produced by the method.

2. Related Art

For the delivery of fuel out of the tank, in addition to at least one electrical main fuel delivery pump, use is also made of further pumps to ensure that the electrical main fuel delivery pump can adequately deliver fuel in all operating situations of the motor vehicle and in any filling state of the tank. This is necessary in particular in the case of rugged tanks.

For this purpose, use is made in particular of so-called suction jet pumps. In using a suction jet pump, to deliver the fuel, a propulsion jet is delivered through a suitably designed nozzle. In this way, a negative pressure is generated at a downstream suction pipe, whereby fuel is drawn in from the surroundings of the inlet of the suction pipe. The fuel is delivered for example to the main fuel delivery pump, and from there to the internal combustion engine. The propulsion jet required for the operation of the suction jet pump is branched off from the volume flow delivered by the main fuel delivery pump.

In the prior art, both devices that provide a single suction jet pump in the tank, and devices that provide a multiplicity of suction jet pumps, are known. The suction jet pumps are designed taking into consideration the respective boundary conditions for operation, such as, inter alia, the working pressure range of the main fuel delivery pump, the delivery head, the delivery rate, the working temperature or the viscosity of the fuel.

The suction jet pumps are in particular configured such that adequate fuel delivery is ensured over the entire temperature range of the fuel. The delivery rate of the suction jet pump is, inter alia, significantly determined by the structural design of the suction jet pump, for which reason a dynamic adaptation of the delivery rate is possible only in narrow limits by a variation of the propulsion jet. This has the effect that the suction jet pumps are designed so as to offer an adequate delivery rate even in the presence of very poor boundary conditions.

Suction jet pumps are produced, for example, from plastics using an injection molding process. To produce the nozzle and the flow channel positioned upstream of the nozzle in a flow direction, mold parts are used for this purpose, which are encapsulated with plastic. In the case of a single-piece suction jet pump, in which the flow channel leading to the nozzle is integrally connected to the nozzle itself, it is inevitably the case that an opening is formed by the mold part at that end of the flow channel that is situated opposite the nozzle. This occurs because of the mold part, which occupies the internal volume of the flow channel and the internal volume of the nozzle during the injection-molding process. To remove the mold part after the injection-molding process, it must be removed from the injection-molded component in the direction of the relatively large internal diameter. Otherwise, undercuts in the component could prevent a removal of the mold part after the injection-molding process. The opening additionally formed on the flow channel for manufacturing reasons must be subsequently closed off in order to ensure the full functionality of the suction jet pump.

In the prior art, for this purpose, suction jet pumps are known whose opening situated opposite the nozzle is closed off by a metal ball being pressed in.

A disadvantage of the devices known from the prior art is that the closure by the pressing-in of a metal ball provides security only up until a defined delivery pressure of the suction jet pump is reached. In light of the delivery pressures in the fuel delivery system, which will increase in future, functional failures of the suction jet pump as a result of closure balls that have become detached are to be expected with the known solutions.

SUMMARY OF THE INVENTION

It is therefore an object of the present invention to provide a method for the production of a suction jet pump, which method permits the production of a suction jet pump with an improved closure of the installation opening on the flow channel positioned upstream of the nozzle. It is also an object of the invention to provide a suction jet pump produced by the method according to the invention.

An exemplary embodiment of the invention relates to a method for the production of a suction jet pump for delivering fuel in a fuel tank or out of a fuel tank, wherein the suction jet pump has a flow channel and a nozzle, wherein the flow channel forms a feed line to the nozzle and the flow channel is formed in one piece with the nozzle, wherein, for the production, the following steps are performed in succession:
  placing a mold core into a matrix for the production of the suction jet pump by injection molding,
  encapsulating the mold core and filling the cavity formed between the mold core and matrix with a plastic,
  removing the mold core through an installation opening, situated opposite the nozzle, in the flow channel,
  closing the installation opening by thermal deformation, in the edge region of the installation opening, of the plastic used for the production.

It is known in the prior art for suction jet pumps to be produced from plastic. For the processing of plastics in particular, injection molding is a customary manufacturing method that makes it possible to produce filigree components. The encapsulation of mold cores in dies makes it possible here to produce a large number of different components with large degrees of freedom.

A matrix means, in particular, a mold into which mold cores can be placed. The cavities formed between the mold and the mold cores are subsequently filled out with a plastic by injection molding. Here, the mold cores are preferably configured such that no undercuts are produced, and such that the mold cores can be easily pulled out of the component produced.

For this purpose, according to one aspect of the invention, an installation opening is provided in the suction jet pump. To produce a functioning suction jet pump, however, this installation opening must be closed off in order to permit a directed delivery of the fuel.

To realize a particularly pressure-stable closure of the installation opening, it is particularly advantageous to use a molding method, in particular a thermal deformation process, which makes it possible to realize a permanent closure. Hot calking provides a punch which can be warmed in order to warm the plastic that is used to above a defined minimum temperature and to effect a thermoplastic deformation under pressure. Here, the punch may preferably be adapted to the shape that it is sought to realize as a result of the hot calking.

It is particularly advantageous if, prior to the thermal deformation, the installation opening is closed off through the insertion of a metal ball.

Through the insertion of a metal ball, the stability of the suction jet pump in the region of the installation opening to be closed off can be influenced. Furthermore, by the metal ball, the shaping of the material to be deformed by the hot calking can be simplified, because the warmed material can be molded against the outer contour of the metal ball.

It is also advantageous if the metal ball is pressed into the installation opening. The pressing-in is advantageous in order to produce a more secure seat of the metal ball and thus improve the stability, in particular the leak-tightness, of the closure of the installation opening.

In a preferred exemplary embodiment, the metal ball is fixed in the installation opening as a result of the thermal deformation. This is advantageous in order to produce a particularly stable closure of the installation opening. The metal ball may be entirely or partially enclosed by the deformed plastic. In the case of the metal ball being partially enclosed by the plastic, it is preferable for the remaining installation opening to be smaller in terms of the opening cross section than the diameter of the metal ball.

It is also preferable if the thermal deformation is performed by hot calking, wherein a warmed punch acts under pressure on an outer region of the flow channel, in particular the installation opening or the border thereof, wherein a material fraction of the flow channel or of the border of the installation opening is warmed and deformed. Hot calking can be easily used in a mass production environment for the output of high unit quantities, and permits shaping with large degrees of freedom.

The object relating to the suction jet pump may be achieved by a suction jet pump having the features described herein.

An exemplary embodiment of the invention relates to a suction jet pump for delivering fuel into a fuel tank or out of a fuel tank, wherein the flow channel is of rectilinear form, and the installation opening is arranged, at that end of the flow channel that is averted from the nozzle, in the wall that delimits the flow channel in an axial direction.

The flow channel can preferably be flowed through along an axial direction, and is preferably delimited in a radial direction by encircling walls. The flow channel preferably has an unchanging diameter along its axial extent. In an alternative embodiment, a cross section whose diameter varies along the axial direction may also be realized. It is advantageous if the nozzle directly adjoins one of the end regions of the flow channel in an axial direction. The nozzle produces a narrowing of the cross section from the size of the flow channel to the size of the nozzle opening.

The installation opening is particularly advantageously arranged, in an axial direction, at that end region of the flow channel that is situated opposite the nozzle. This facilitates the production process, because the mold core can be pulled in an axial direction out of the nozzle and out of the flow channel.

It is furthermore advantageous if the flow channel has a feed line opening that penetrates through the wall of the flow channel in a radial direction, wherein the feed line opening is arranged directly adjacent to the installation opening. Such a feed line opening is preferably fluidically connected to a fluid line of the main fuel delivery pump, such that the fuel delivered by the suction jet pump originates directly from the main fuel delivery pump.

It is furthermore advantageous if the flow channel and the nozzle have a common central axis. This is particularly advantageous, because the suction jet pump is then particularly easy to produce, and the pressure losses within the suction jet pump can be minimized.

Advantageous refinements of the present invention are described in the following description of the figures.

BRIEF DESCRIPTION OF THE DRAWINGS

The invention will be discussed in detail below on the basis of exemplary embodiments and with reference to the drawings. In the drawings.

DETAILED DESCRIPTION OF THE PRESENTLY PREFERRED EMBODIMENTS

Figure 1:
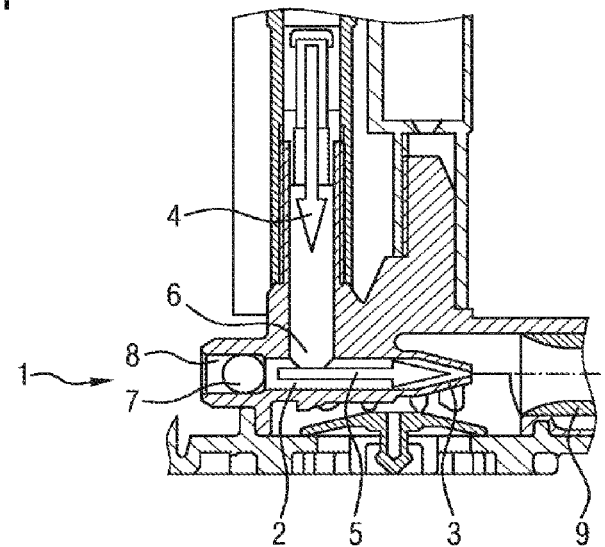
FIG. 1 shows a sectional view through a suction jet pump such as is known from the prior art, wherein a metal ball has been pressed into the installation opening at the axial end of the flow channel in order to close off the installation opening.

FIG. 1 shows a sectional view through a suction jet pump 1 such as is known in the prior art. The suction jet pump 1 has a flow channel 2, which can be flowed through along the arrows 4 and 5 and which opens into the nozzle 3 at its right-hand axial end region. The flow channel 2 has a diversion 6 which serves for the diversion of the fuel flowing through the flow channel 2. The fuel is preferably delivered through the flow channel 2 by a main fuel delivery pump.

After flowing through the nozzle 3, the fuel flows over into a suction pipe 9 positioned downstream of the nozzle 3. As a result of the acceleration of the fuel as it flows through the nozzle 3, a negative pressure forms directly at the nozzle outlet, which negative pressure entrains the fuel in the entry region of the suction pipe 9, whereby a delivery of fuel through the suction pipe 9 is realized.

At the left-hand axial end region of the flow channel 2, there is provided an installation opening 8 which, in the exemplary embodiment of FIG. 1, is closed off by a pressed-in metal ball 7. The installation opening 8 serves in particular for the removal of the mold core that has been used for the production of the suction jet pump 1 by an injection-molding process. It can be seen that the installation opening 8 has a slightly larger cross section than the flow channel 2 positioned downstream, and in particular than the nozzle 3 positioned downstream. This promotes the manufacturing process, because no undercuts are produced along the flow channel 2 and the nozzle 3. A mold core arranged in the suction jet pump 1 can thus be easily removed through the installation opening 8.

Figure 2:
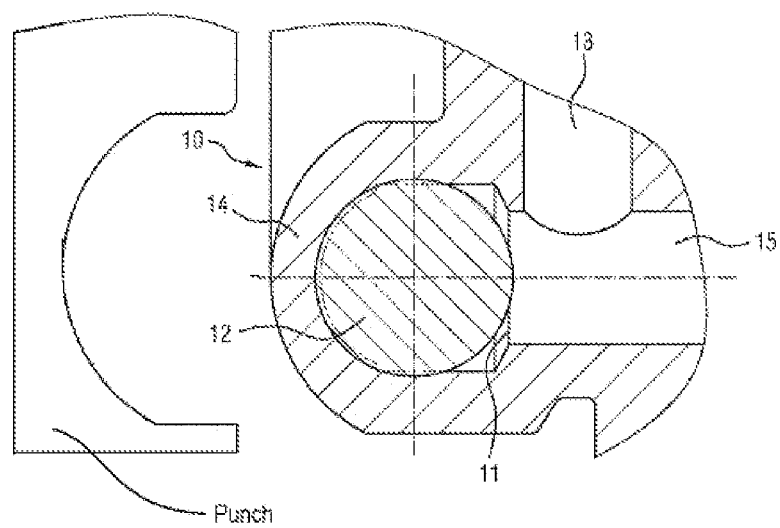
FIG. 2 shows a sectional view through the axial end region of the flow channel of a suction jet pump, wherein, in addition to the pressing-in of the metal ball, hot calking of the housing of the suction jet pump has been performed in order to fix the metal ball in positively locking fashion in the installation opening.

FIG. 2 shows a suction jet pump 10 according to the invention, wherein the detail of FIG. 2 illustrates in particular the left-hand axial end region of the flow channel 15, which has the installation opening 11, the metal ball 12 and the diversion 13.

Also shown is the deformed housing region 14 produced as a result of hot calking, which fixes or secures the metal ball 12 in its seat.

The suction jet pump 10 is otherwise constructed similarly to the suction jet pump 1 shown in FIG. 1.

The metal ball 12 can be placed into the installation opening 11 or into the housing section that forms the installation opening 11. Alternatively, the metal ball 12 may also be pressed into the housing section or the installation opening 11. Initial securing of the installation opening 11 can be realized in this way.

Additionally, in FIG. 2, the metal ball is fixed in positively locking fashion to the suction jet pump 10 by the housing region 14. The housing region 14 has been produced by thermal deformation using hot calking. For this purpose, it is, for example, possible for partial regions of the housing that project beyond the metal ball 12 to be deformed by a warmed punch by application of pressure. The material warmed by the punch is in this case deformed and molded against the outer contour of the metal ball 12. The punch preferably has a shape corresponding to the outer surface of the ball, in order to achieve that the plastic is molded closely against the metal ball 12.

Figure 3:
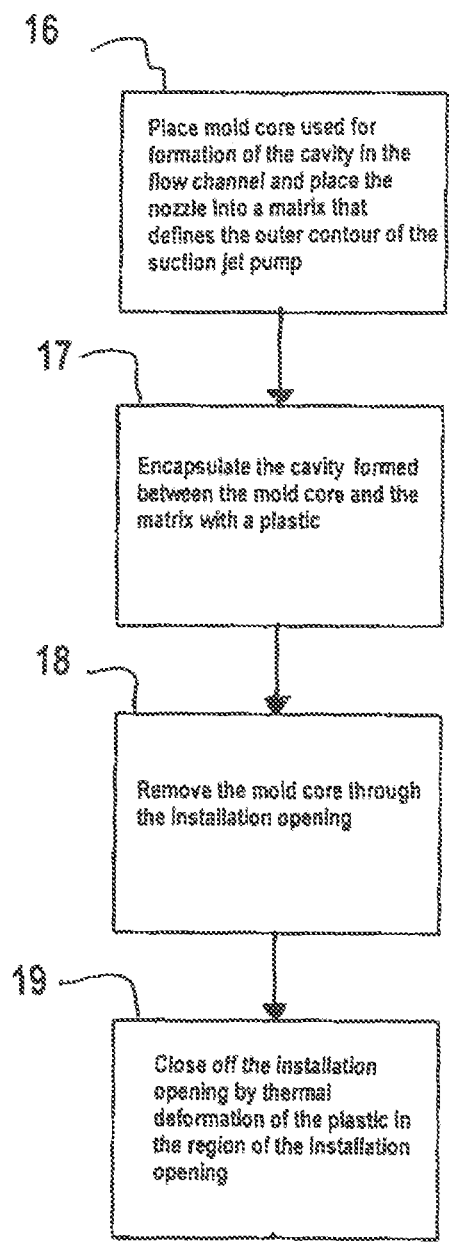
FIG. 3 shows a block diagram for illustrating the sequence of the method according to the invention.

FIG. 3 shows a flow diagram for describing the method according to the invention for the production of a suction jet pump with a closure of the installation opening produced by hot calking.

In block 16, a mold core used for the formation of the cavity in the flow channel and the nozzle is placed into a matrix that defines the outer contour of the suction jet pump. In block 17, the cavity formed between the mold core and the matrix is encapsulated with a plastic. In block 18, the mold core is removed through the installation opening. In block 19, the installation opening is closed off by thermal deformation of the plastic in the region of the installation opening.

Optionally, in a further method step performed between the method steps in blocks 18 and 19, a metal ball may be inserted into the installation opening, which metal ball is fixed or secured in the installation opening as a result of the thermal deformation of the plastic.

The exemplary embodiment in FIG. 2 is in particular not of a limiting nature, and serves for illustrating the concept of the invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for production of a suction jet pump (10) for delivering fuel into a fuel tank or out of the fuel tank, wherein the suction jet pump (10) has a flow channel (15) and a nozzle, wherein the flow channel (15) forms a feed line to the nozzle, and the flow channel (15) is formed in one piece with the nozzle, the method for production comprising, in the following order: placing a linear mold core having a first diameter configured to form the flow channel, a frustoconical transition portion, and a second diameter configured to form an installation opening (8) that is greater than the first diameter into a matrix to produce the suction jet pump (10) by injection molding and form a cavity between the mold core and the matrix, wherein the frustoconical transition portion begins at the first diameter configured to form the flow channel and ends at the second diameter configured to form the installation opening; encapsulating the mold core and filling the cavity formed between mold core and matrix with a plastic; removing the mold core through the installation opening, arranged opposite the nozzle, in the flow channel (15); and closing the installation opening by thermal deformation, in the edge region of the installation opening, of the plastic used for the production of the suction jet pump (10); wherein the transition portion is in a wall from which the flow channel (15) extends in an axial direction.

2. The method as claimed in claim 1, further comprising, prior to the thermal deformation, closing off the installation opening by inserting a metal ball (12) in the installation opening.

3. The method as claimed in claim 2, wherein the inserting of the metal ball (12) comprises pressing the metal ball (12) into the installation opening.

4. The method as claimed in claim 2, wherein the thermal deformation fixes the metal ball (12) in the installation opening.

5. The method as claimed in claim 2, wherein the frustoconical transition portion has a constant slope.

6. The method as claimed in claim 5, wherein the frustoconical transition portion has an uninterrupted radially inward facing circumferential surface.

7. The method as claimed in claim 1, wherein the thermal deformation is performed by hot calking, in which a punch, which is configured to be warmed, acts under pressure on an outer region of the flow channel (15), and a material fraction of the flow channel (15) is warmed and deformed.

8. A suction jet pump (10) for delivering fuel into a fuel tank or out of the fuel tank, wherein the suction jet pump (10) is produced in accordance with method as claimed in claim 1, wherein the flow channel (15) is of rectilinear form, and the installation opening is arranged, at that end of the flow channel (15) that is opposite from the nozzle, in the wall from which the flow channel (15) extends in the axial direction, wherein the installation opening has a diameter that is larger than a diameter of the flow channel, and wherein the transition portion is frustoconical and begins at the first diameter configured to form the flow channel and ends at the second diameter configured to form the installation opening.

9. The suction jet pump (10) as claimed in claim 8, wherein the flow channel (15) has a diversion (13) which radially penetrates through an axial wall of the flow channel (15), wherein the diversion (13) is arranged directly adjacent to the installation opening.

10. The suction jet pump (10) as claimed in claim 9, wherein the flow channel (2, 15) and the nozzle share a common central axis.

11. The suction jet pump (10) as claimed in claim 8, wherein the installation opening is sealed at least in part by a fixed metal ball.

12. The suction jet pump (10) as claimed in claim 8, wherein a metal ball is at least partially enclosed in the installation opening and a remaining portion of the installation opening is smaller than a diameter of the metal ball.

13. The suction jet pump (10) as claimed in claim 8, wherein the installation opening and the flow channel are linearly arranged.

14. The suction jet pump (10) as claimed in claim 8, wherein the frustoconical transition portion has a constant slope.

15. The suction jet pump (10) as claimed in claim 14, wherein the frustoconical transition portion has an uninterrupted radially inward facing circumferential surface.

* * * * *